(No Model.)
F. REDMOND.
NUT LOCK.
No. 370,559. Patented Sept. 27, 1887.
FIG: 1.
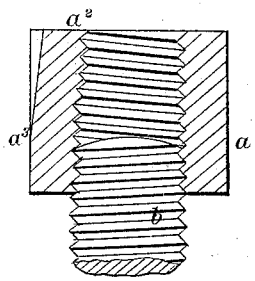
FIG: 4.
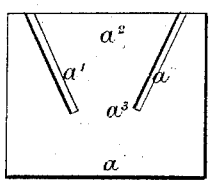
FIG: 5.
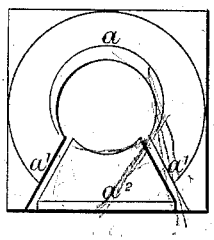
FIG: 6.
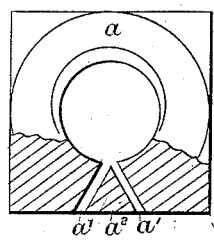
FIG: 2.
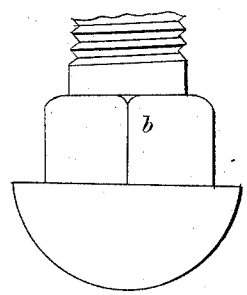
FIG: 7.
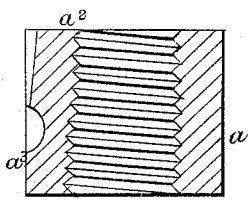
FIG: 8.
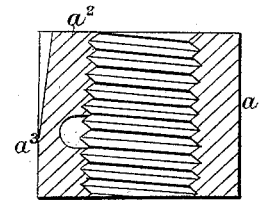
FIG: 3.
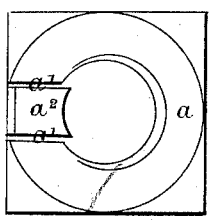
FIG: 9.
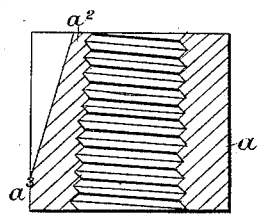
FIG: 10.
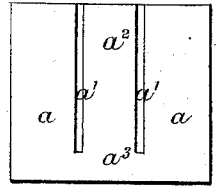
Attest:
Emma Arthur.
H B Knight
Inventor:
Francis Redmond
By Knight Bros
Attys.

UNITED STATES PATENT OFFICE.

FRANCIS REDMOND, OF LONDON, ENGLAND.

NUT-LOCK.

SPECIFICATION forming part of Letters Patent No. 370,559, dated September 27, 1887.

Application filed July 27, 1887. Serial No. 245,424. (No model.)

*To all whom it may concern:*

Be it known that I, FRANCIS REDMOND, a subject of the Queen of Great Britain, residing at 96 Newgate street, in the city of London, England, manufacturers' agent, have invented certain new and useful Improvements in Screw-Nuts, of which the following is a specification.

The invention has for its object to produce a nut which will automatically lock or fasten itself upon its bolt when screwed into the desired position. For this purpose I form two saw-cuts or slots completely through one side of an ordinary nut and for a considerable part of its depth in such manner as to leave a tongue of metal without any support except at its base. This tongue of metal is then pressed slightly inward, in order to give it a permanent set in that direction, so that in the act of screwing it upon the bolt and when screwed home it shall constantly exert a spring-pressure upon the bolt. If desired, the saw-cuts or slots may be formed at such an angle and in such direction to each other as to reduce the section of the spring-tongue and thereby increase its elasticity. This construction also serves to insure the spring-tongue being depressed only to the required extent in the process of manufacture. In order to weaken the spring-tongue and render it more elastic, its section may be reduced by forming a groove on its outer or inner surface or otherwise. By these means I obtain a nut which will automatically lock itself upon its bolt and will there remain, notwithstanding any vibration to which it may be subjected, until it is forcibly moved by means of a spanner.

In order that the said invention may be more clearly understood and readily carried into effect, I will proceed, aided by the accompanying drawings, more fully to describe the same.

In the drawings, Figures 1, 2, and 3 represent one form in which the invention may be carried into effect. Figs. 4, 5, and 6 represent another form, and Figs. 7, 8, 9, and 10 represent slight modifications of nuts constructed according to this invention.

In all the figures, $a$ represents the body of the nut, which may be of any ordinary form.

$a'$ $a'$ represent two saw-cuts or slots, which I make completely through the thickness of one side of the nut and for a considerable part of its depth in such a manner as to leave a tongue of metal, $a^2$, without any support except at its base $a^3$. This tongue $a^2$, between the two slots $a'$ $a'$, is then forced slightly inward in order to give it a permanent set in that direction, so that it shall be impossible to screw the bolt $b$ into the nut without forcing back this tongue $a^2$ into its original position, or nearly so. This tongue $a^2$ therefore acts as a kind of spring and presses against the bolt with a considerable amount of force, thereby securing the nut $a$ firmly upon the bolt, and consequently preventing the possibility of their chattering loose in relation to each other, notwithstanding any amount of vibration to which they may be exposed.

In the form represented at Figs. 1, 2, and 3 the saw-cuts $a'$ $a'$ are formed parallel to each other; but, if desired, they may, as represented in the form shown at Figs. 4 and 5, be formed at such angles in relation to each other as to reduce the section of the spring-tongue at its base $a^3$, as shown at Fig. 6, and thereby increase its elasticity, while the top of the spring-tongue $a^2$ will be of such width as to afford ample area of bearing between the top threads of the spring-tongue $a^2$ and the threads of the bolt.

The spring-tongue $a^2$, when of either form shown at Figs. 1 to 6, may be made more elastic by reducing its section externally, as shown at Fig. 7, or internally, as shown at Fig. 8, which can be effected by grooving or otherwise at the point where it joins the solid part of the nut.

In the modification shown at Figs. 9 and 10 the spring-tongue $a^2$ is formed tapering in section from its junction, $a^3$, with the solid part of the nut to its upper or free end in order to render it more elastic. In this modification I prefer to make the cuts $a'$ to a greater depth in the side of the nut than in the previously-described forms.

In screwing the nut upon an ordinary bolt it is preferable to put the solid end of the nut on first, as shown at Fig. 1; but the bolt $b$ can, if desired, be inserted in the other end of the nut, if the point of the bolt is somewhat reduced in size to permit it to enter and force back the spring-tongue $a^2$.

In Fig. 1 the bolt $b$ is shown in elevation and the nut $a$ in section. It will be seen that the nut could be easily screwed upon the bolt as far as shown; but the use of a spanner would be required to screw the nut completely upon the bolt, thus forcing back the spring-tongue $a^2$, which exerts considerable pressure on the bolt.

In the form of nut represented at Figs. 4, 5, and 6 the spring-tongue $a^2$ could not be pressed in too far, as the sides of saw-cuts $a'$ will form a kind of gage, which would be an advantage in the manufacture.

I would here remark that I am aware that it has been heretofore proposed to cut one or more slots across the top of a nut so as to divide the nut to a given depth into a number of equal-sized jaws, which were all forced inward, so as to give a permanent set to them in that direction, but this resulted in an undue weakening of the nut; but according to the present invention the nut is left intact for a considerable portion of its circumference, and a spring-tongue is formed only in one side thereof, by which means the strength of the nut is not materially impaired and a sufficient lock is obtained in a nut of the ordinary thickness.

Having now particularly described and ascertained the nature of my said invention and in what manner the same is to be performed, I declare that what I claim is—

A screw-nut formed with a spring-tongue in one side of it and having the greater portion of its circumference or body solid or intact, substantially as herein shown and described, and for the purpose stated.

FRANCIS REDMOND.

Witnesses:
B. J. B. MILLS,
C. M. WHITE,
*Both of 23 Southampton Buildings, London.*